United States Patent
Mundkur

[15] 3,671,754
[45] June 20, 1972

[54] SCANNING APPARATUS FOR BIOLOGICAL MICRODENSITOMETRY

[72] Inventor: Balaji Mundkur, Storrs, Conn.

[73] Assignee: University of Connecticut, Storrs, Conn.

[22] Filed: June 18, 1968

[21] Appl. No.: 737,967

[52] U.S. Cl. .............................................. 250/236, 350/272
[51] Int. Cl. ......................................... H01j 5/16, G02f 1/30
[58] Field of Search ................. 250/233, 236; 350/272, 279, 350/273, 275; 356/169

[56] References Cited

UNITED STATES PATENTS 1,842,759   1/1932   Malm ................................ 350/272 X
2,967,907   1/1961   Stamps .............................. 350/272 X
2,989,891   6/1961   Rockafellow ..................... 350/272 X
3,167,605   1/1965   Heidenhain .......................... 350/272

*Primary Examiner*—Roy Lake
*Attorney*—Beveridge & De Grandi

[57] ABSTRACT

A scanning device that includes a pair of opaque members which rotate about a common axis and lie across the path of radiant energy where one member has a transparent area in the form of a straight line and the other member contains a transparent area in the form of a logarithmic spiral so that when the discs are rotated at different speeds they produce a scanning aperture of constant shape and configuration formed by the intersection of the transparent areas.

9 Claims, 8 Drawing Figures

PATENTED JUN 20 1972 3,671,754

INVENTOR
BALAJI MUNDKUR

BY
Browne Schuyler & Beveridge
ATTORNEYS

SCANNING APPARATUS FOR BIOLOGICAL MICRODENSITOMETRY

BACKGROUND

This invention relates to a scanning device which employs a pair of opaque members rotatable around a common axis, and having transparent apertures which intersect to provide a moving scanning aperture which traverses an image field.

One field where this invention finds particular utility is in connection with biological microdensitometry where cells or tissues are analyzed by using a light microscope. Commonly, the cells or tissues are subjected to cytochemical methods for the selective localization of substances by reactions whose end products are colored. Then, the degree of extinction of monochromatic wavelengths specifically absorbed by the colored reaction products is measured to determine the concentration of the particular substance.

Similarly, the concentration of any specific chemical component in untreated specimens may be determined if the peak of absorbed wavelengths is known for that component. For example, the concentration of deoxyribonucleic acid may be found by subjecting the specimen to a wavelength of 2,650 A. in the ultraviolet region and measuring the amount of light transmitted. Similarly, wavelengths of 2,800 A. may be used to evaluate quantitatively tyrosine in the specimen.

In common practice, these microdensitometric procedures involve the positioning of a single, small fixed aperture in the microscope image plane, over the area of interest in the cell, followed by time-consuming measuring operations. The amount of monochromatic light absorbed by this region is then calculated in accordance with criteria well-established by the Beer-Lambert Laws. The optical requirements, aside from the special circumstances imposed by the microscope and the nature of the specimen, are in general no different in biology than in conventional spectrophotometric work with fluids contained in a cuvette. However, the biologist has to contend with a greater number of variables and difficulties, such as lenticular glare arising from the microscope, inconstancy of optical path lengths, and other factors. These oftentimes tend to lessen accuracy in addition to imposing certain physical drawbacks.

The chief of these is what is termed "distributional error," i.e., an inaccuracy arising from inhomogeneous spread of the light-absorbing substance within a given area surveyed by a photomultiplier or other devices which detects radiant energy. This difficulty is practically unavoidable in cytology and it must be neutralized by resort to working sequentially with one or two absorbing wavelengths in addition to one normally employed.

In working with ultraviolet wavelengths and in precise, rapid work at all times with visible wavelengths as well, the prior art has recognized that techniques for scanning the specimen are mandatory. Scanning techniques involve the rapid movement of a small aperture, in a repetitive pattern of parallel lines, in the image plane of a light microscope. Alternatively, the microscope stage holding the specimen itself is moved in this fashion while a single stationary aperture in the image plane scans different parts of the moving image, at successive intervals of time. "Flying-spot" methods have been used in conjunction with complex electronic apparatus which utilizes the principles of scanning used in television technology.

All existing scanning devices in biology are characterized by one or more drawbacks. For example, when using electronic or mechanical scanning devices, the scanning raster involves unscanned lines or "dead spots" between the scan lines. Portions of the microscopic specimen, especially very small parts such as mitochondria or granules, if they are small enough to lie wholly or in part along these unscanned lines, make no contribution to the process of estimating extinction values and may introduce statistical errors during integration of the separate, instantaneous absorbtion values recorded during the movement of the scanning aperture. The errors increase in magnitude in direct proportion to the inhomogeneity of distribution of the light-absorbing cellular component.

In some instruments, the scanning aperture is circular, a shape conducive to introduction of errors. If a circular scanning aperture is used, those parts of the microscopic specimen passing across the diameter of the moving aperture make a greater contribution to the integrated absorbance than those passing through the edge.

In an effort to avoid such errors, circular scanning apertures are frequently overlapped as in the original Nipkow disc of early television. A 50 percent overlap is common; it is unnecessary in biological microspectrophotometry and may introduce random error by non-uniform repetitive sampling of the same area or areas. The error increases in proportion to the non-random distribution of absorbing components within cells. In addition, physical limitations preclude the use of large numbers of very small, closely and accurately spaced apertures if good resolution is desired.

In certain mechanical scanning instruments, the nature of the construction may introduce errors originating in varying shapes of the aperture. In the instrument described by Deeley in the Journal of Scientific Instrumentation, Vol. 32, pages 263–267, a series of separate apertures is produced in the image plane by the intersection of straight lines cut in a single metal disc and a separate rectangular plate moving in a definite relationship to each other. The successive readings yielded by the apertures separately at successive intervals of time are electronically integrated and presented as an average count in about 4.5 seconds per cell or part of a cell. The scanning apertures vary continuously in shape from a true square at the center of the scanning area to rhombii of varying angles at the periphery of the zone of scanning. As a consequence, the areas of the scanning apertures are inconstant and constitute a source of error in critical quantitative microscopical measurement of specimens in which the absorbing component is very inhomogeneously distributed and characterized by wide variations in absorbance of light.

According to a preferred embodiment of my invention, a pair of opaque discs with transparent openings are rotated about a common axis at different angular velocities. It is important to stress that these angular velocities bear a definite relation to each other. The transparent openings in the two discs intersect to provide a scanning aperture of quadrilateral shape which moves to expose, sequentially, substantially all of the field being studied. One disc carries at least one linear, very narrow and elongated transparent opening which moves across the field continuously, at a uniform speed, only once during a scanning cycle. The other disc has at least one thin elongated transparent opening in the form of a logarithmic spiral which moves across the field repeatedly during the scanning cycle. The resulting scanning aperture or zone through the two discs moves longitudinally along the straight slot during the movement of the straight slot across the field at a constant uninterrupted velocity.

A logarithmic spiral is, by definition, a spiral all tangents of which form a same angle with the radius intersecting at the point of tangency. Such spirals are also called logistic or equiangular spirals. With this definition in mind, it will be understood that there will be an area of constant shape formed at the intersection of a logarithmic spiral slot on one disc and a straight line slot on another disc, provided that the discs move about a common axis and each slot is of uniform width. If the straight line slot is radially oriented and the slots are of equal width, a rhombus having a constant angle will be formed.

The principal and most pertinent aspect of this invention involves one disc with mirror-image spiral slots, which are preferably but not essentially logarithmic spirals. During their movement, the mirror-image spirals intersect sequentially with a straight line slot on another moving member. Rapid movement of the spiral slots over the moving straight slot will produce a smooth continuous movement of the resulting scanning aperture or zone up along one spiral and down along the other spiral to cover the scanned field during the motion of the straight line slot across the scanned field.

This invention enables the present device to scan a field by means of apertures of uniform size and shape, which renders it particularly suitable for use with devices such as photomultiplier tubes and associated circuitry which measure and integrate, during a scanning cycle, the intensity of radiant energy passing through a specimen in a microscope.

There are numerous advantages which result from this invention. First, it permits the elimination of appreciable dead spots in the scanned field which exist in systems which employ electronic scanning techniques with their inherent raster lines. Second, the presence of a quadrilateral scanning aperture makes it unnecessary to overlap the paths of movement of the scanning aperture. Third, it permits the construction of apparatus wherein the resultant scanning aperture may have a constant area, to ensure accuracy when used in connection with quantitative sensing means such as intensity-time integrating devices using photomultiplier tubes. Fourth, the invention permits the scanning of a field in a pattern whereby substantially each portion of the field is exposed for an equal interval of time, preferably only once and without overlap. Fifth, the moving parts are few, light and rotate at relatively low speeds, thus simplifying construction and avoiding a need for excessive maintenance.

DESCRIPTION OF PREFERRED EMBODIMENTS

Two possible embodiments of this invention are illustrated herein; however, it is understood that numerous variations thereof may be devised within the spirit of this invention.

Figure 1:
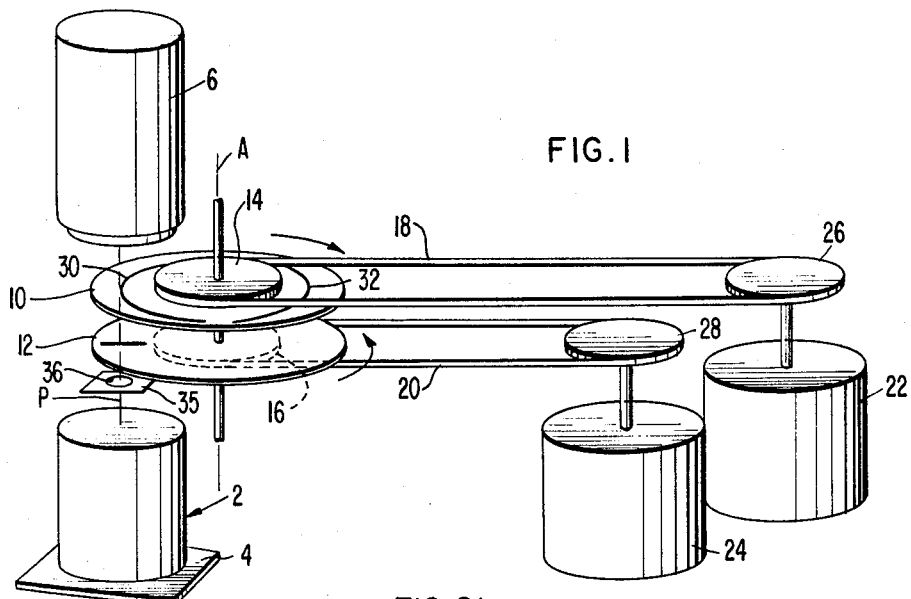
FIG. 1 is a diagrammatic perspective view of the apparatus of the invention.

FIG. 1 illustrates diagrammatically the principal elements employed in a preferred embodiment. A light microscope 2 has means for supporting a specimen 4 and a conventional optical system which may yield a degree of magnification of between 1,000X to 2,000X. The radiant energy from the microscope moves parallel to the path P to a device for sensing radiant energy such as the end-on-photomultiplier tube 6. A catadioptric condensor focuses the radiant energy onto the cathode of the photomultiplier tube 6.

The path of the radiant energy from the microscope to the photomultiplier tube 6 is interrupted by an iris diaphragm 35 which has a variable opening at 36 and a pair of opaque discs 10 and 12 which are rotatable about a common axis A. The discs are provided with fiber gears 14 and 16 which mesh with the timing belts 18 and 20 or other suitable gearing. Motive power for the belts 18 and 20 is provided by the motors 22 and 24 which have gears 26 and 28 mounted on their shafts.

Due to the precise nature of the work performed in such apparatus and the inherent need for accurate speed control, the motors 22 and 24 are preferably of the synchronous, hysteresis type. The gears 26, 28 and any others required if the timing belts 18 and 20 are eliminated are made of stainless steel or brass.

The disc 10 is, for the most part, opaque to the type of radiant energy sensed by the photomultiplier tube 6. It is, however, provided with narrow, elongated portions 30 and 32 which are transparent to the particular type of radiant energy. If the disc 10 is a thin metal disc, the transparent portions 30 and 32 may be slots accurately formed in the disc.

Figures 2A, 2B, 2C:
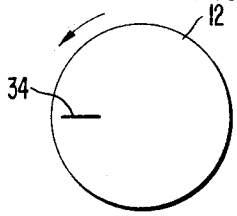
FIG. 2a, 2b and 2c show a preferred combination of discs used in the invention, with FIGS. 2c showing the individual discs of FIGS. 2a and 2b in superposed relation.

The nature of the slots 30 and 32 is perhaps best illustrated in FIG. 2b where it will be seen that they are mirror image spirals. Preferably, they are logarithmic spirals which, by definition, are spirals, all tangents of which form an equal angle with a radius drawn through the point of tangency.

The disc 12 has a transparent portion 34 which is a straight line slot which may be radially aligned with the axis of rotation A of the disc 12. This disc 12 is rotated by the motor 24 through the gear 28, timing belt 20 and gear 16. Its angular velocity is substantially less than that of the disc 10.

The manner in which the discs 10 and 12 and their transparent portions operate to scan a field may be seen in FIG. 2c which shows the relative positions of the transparent portions of the superposed discs. The small circular area 36 is formed by an iris diaphragm which permits adjustment in the size of the field to be scanned, which is referred to herein as the scanned field.

During a scanning cycle, the straight line transparent portion 34 moves across the scanned field 36 only once. The disc 10 with its spiral slots is moved in a manner whereby at least one of the spiral slots will pass across the radial slot 34 as the center of the radial slot moves through a distance equal to its circumferential dimension which, in this case, is its width. For equal scanning of the field, one or more spiral slots must move entirely across the radial slot during the time interval that the center of the radial slot moves through a path equal to its circumferential dimension. Of course, the mirror image spirals will, in sequence, come into intersecting alignment with the radial slot 34 and, due to their rapid movement thereacross, will produce a scanning movement of the quadrilateral scanning aperture formed at their intersection. Each movement of the scanning aperture will be smooth, continuous and at a constant velocity. Since the spiral slots are mirror images of each other, one spiral slot will produce a left-to-right traversing movement of the scanning aperture while the other spiral slot will produce a reverse movement of the scanning aperture. Proper selection of the relative angular velocities of the discs 10 and 12 is capable of producing a scanning pattern in which the field is scanned to an equal extent without substantial overlap. In this connection, it is desirable to locate the field 36 toward the periphery of the disc and to minimize its area so that substantial errors will not result from the slight divergency between the various positions of the radial slot 34.

Figure 4:
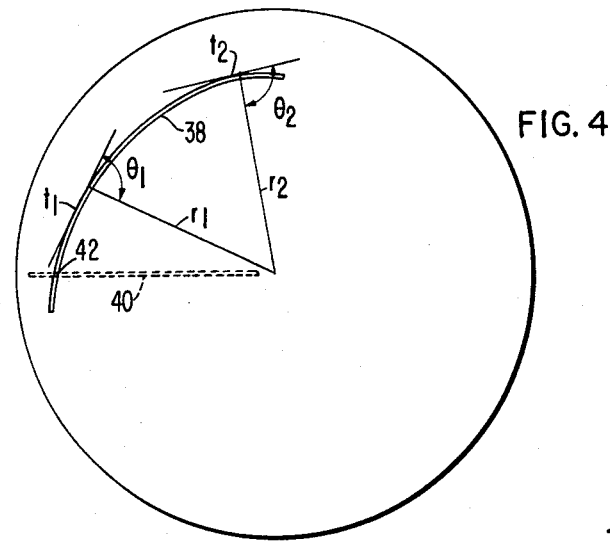
FIG. 4 shows a disc with a single logarithmic spiral of the type preferred for construction of the discs shown in FIGS. 2b and 3b.

As mentioned previously, it is desirable to have the spiral slots 30 and 32 in the form of logarithmic spirals. The advantage of this type of spiral is that its tangents will always form a same angle with radial lines drawn to the point of tangency; and, therefore, the scanning aperture produced by such a spiral and a straight line on a concentrically rotatable disc will have a uniform shape at all times. This principle is best illustrated in FIG. 4 which shows a single logarithmic spiral 38 which may be on one disc and which may intersect a straight line transparent portion 40 on another disc.

It will be observed that the angles $\theta_1$ and $\theta_2$ which are formed by the radial lines $r_1$ and $r_2$ and the tangent lines $t_1$ and $t_2$ are equal. Accordingly, the scanning aperture 42 which results at the intersection of the transparent portions 38 and 40 will always have the same shape. If the width of the transparent slots 38 and 40 are equal and if the slot 40 is radially oriented, the scanning aperture 42 will always be a rhombus having a constant angle and a constant area.

The significance of providing a quadrilateral scanning aperture with a constant area will be appreciated when one considers the nature of the quantitative measuring system employed in apparatus of this type with the photomultiplier tube. In order to measure the amount of a particular type of radiant energy arriving at the photomultiplier tube during the scanning of a field, a standard electronic circuit is used to integrate the intensity of the light arriving on the photomultiplier tube 6 and the time. If, when using such apparatus, the area of the scanning aperture 42 varies appreciably, errors would be introduced. For example, if the scanning aperture became larger during an interval of time when scanning a less dense area of the specimen and small when scanning a very dense portion of the specimen, a misleadingly low reading would be obtained. Similar errors would arise if the scanning aperture moved across the field at an irregular velocity. This is avoided by the present apparatus.

Figures 3A, 3B, 3C:
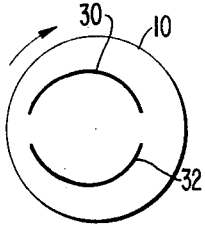
FIGS. 3a, 3b and 3c show another form of the invention, with FIG. 3c showing the individual discs of FIGS. 3a and 3b in superposed relation.

The arrangement shown in FIGS. 3a–c employs many of the principles also found in the apparatus of FIG. 2. In FIG. 3a, a single disc 44 is movable only in one direction and has a series of spaced apart radiating slots 46. The superposed disc 48 shown in FIG. 3b has a series of three logarithmic spirals 50 which inherently produce the advantages discussed in connection with FIG. 4. These logarithmic spirals are geometrically identical to each other in that they conform to the same mathematical formula and they are similarly oriented on the disc. When the discs are placed together across the path of radiant energy, the alignment of their openings will be as represented in FIG. 3c, where 52 designates the scanned field. In this particular arrangement, only one of the radial slots 46 moves across the field 52 during each scanning cycle, while the logarithmic spirals 50 move rapidly thereacross to produce a sweeping action in a single direction. The velocity of the disc 48 or the spacing of the spirals 50 thereon is such that the radial disc would then move through a distance equal to one half its circumferential dimension both during and between successive sweeps of any of the spiral portions 50. The angular velocity of the disc 48 may be increased and will provide equal exposure of the scanned field if a spiral or geometrically identical spirals pass across the radial slot 44 any whole number of times and the slot moves through one-half its circumferential dimension.

In one installation constructed in accordance with the diagrammatic illustration in FIG. 1 the discs 10 and 12 were electroformed from thin bi-metallic sheets of copper and nickel having a thickness of approximately 1.5 to 2.0 mm. The width of the individual slots 30, 32 and 34 is 0.2 mm. The area of the scanned field is controlled by an iris diaphragm having a maximum diameter of 22 mm which encompasses only 20° of the movement of the radial slot 34. The disc 10 was rotated at an angular velocity of 360 rpm, while the disc 12 was rotated only through the 20° arc at an angular velocity of 0.5 rpm. The drive mechanism for the disc 12 permitted reversal of its rotation to return the slot 34 to its original starting position. This may be done by various mechanical means including limiting stops and microswitches which are controlled automatically through external equipment. The excursion of the slot 34 is initiated by a pulse from a Hewlett-Packard Preset Counter Model 5214L simultaneously with the opening of the counter gate for measurements. The excursion of the slot 34 is terminated by a microswitch which simultaneously cuts off electric power to the motor 24 and actuates the preset counter to deliver a digital reading (totalizing, ratio, frequency, preset, etc.) of the signal relayed through the photomultiplier tube 6. A clutch and lever arrangement may be used for returning the slot 34 to its starting position either manually or electrically.

In one arrangement, the logarithmic slots 32 and 30 were arranged so that an angle corresponding to the angle $\theta_1$ and $\theta_2$ in FIG. 4 was 81.75°, thus producing a scanning aperture in the form of a rhombus having an angle of 81.75°. The formula for such slots 30 and 32 is as follows:

$$r = 52.7e^{-.145\theta}$$

where:

$r$ is the radius vector $\theta$ is the angle in radians

The limits of such a logarithmic spiral are between 20° and 165° of the disc and its distance from the axis A would range from 56 to 80 mm.

In precision work, it is naturally important that the transparent portions or slots in the disc 10 and 12 must be very accurately located and dimensioned. One manner of manufacturing such a disc is initially to produce patterns on photographic emulsions or on "Mylar" sheets by a mechanical drafting machine capable of transcribing patterns from data received from computer-programmed tapes or cards. These patterns are appreciably larger than the final dimensions desired for the disc and therefore they are reduced in size before being applied to the metal which eventually is to become the disc.

Transfer of the patterns to the metal may be accomplished by a suitable well-known photoresist technique such as those commonly employed in the manufacture of printed circuits and solid state electrical circuitry.

For situations where accuracy is not of paramount importance, the discs may be made of quartz, fused, silica, glass or plastic which are coated with an opaque material which has scribed transparent areas to provide the transparent spiral and radius portions of the disc.

A suitable photomultiplier tube 6 is produced by the Electrical and Musical Industries Limited of England under EMI Model 9558Q which has extended spectral sensitivity ranging from the low ultraviolet to the infrared ranges. The housing for this tube is exchangable, by means of adapters, with housing for other photomultiplier tubes such as the RCA 1P21,1P 28 or 931A for less stringent applications. The signal from the photomultiplier is amplified and its strength assessed by a galvanometer, a recording photometer or an oscilloscope.

Rather than use the photomultiplier tube and its associated circuitry, the scanning device may also be used in connection with means for visually reproducing the scanned field. Such visual means may include a photographic camera or conventional Orthicon or Vidicon tubes used in television applications which, of course, would be used in conjunction with suitable devices for reproducing the received image. These techniques may necessitate movement of the discs at greater velocities than previously described which would require use of the disc shown in FIG. 3a with any other suitable disc having the spiral transparent portions.

Within the spirit of the invention, numerous modifications may be made to the disclosed apparatus. A single motor may drive both discs through suitable gearing. The concept of the mirror image spirals may, for example, be used in conjunction with nonlogarithmic spirals. The radial slots may be inclined from their radial orientation to any position where they will sweep across the field once during a scanning cycle. One orientation of the slots 46 would result in a square scanning aperture.

Furthermore, the width of the slots may vary along their length. In this connection, it may be found desirable to increase the width of the slot on the slowly moving disc toward its periphery in order to avoid any small dead sports or overlaps resulting from the slight divergence between the various positions of the slot. If this were done, the spiral slot may be reversely shaped with its narrower portion being toward the periphery of the disc so that the resultant scanning aperture would at all times maintain a uniform area.

The velocities of the disc may also be changed as desired by the operator. It is important that the entire field be scanned to an equal extent, but this may be accomplished by scanning it two, three or more times during an incremental movement of the slot on the slowly moving disc.

Other modifications will naturally occur to those working in the field and are intended to be encompassed within the spirit of this invention and by claims which follow.

What is claimed is:

1. Scanning apparatus for controlling the passage of radiant energy to a radiant energy sensing device, said apparatus having two members rotatable about a common axis and lying across a path of radiant energy to the sensing device, each of said members having opaque areas for interrupting the passage of radiant energy to the sensing device and narrow and elongated transparent areas which permit the passage of radiant energy to the sensing device, driving means for moving said members at different velocities relatively across the path of radiant energy leading to the sensing device with their transparent areas being in intersecting alignment to form a moving transparent scanning zone which moves in plural passes across different portions of a scanned field, said scanning zone being smaller in all dimensions than the field, one of said members having a pair of said transparent areas in the form of spirals which are mirror images of each other.

2. Scanning apparatus according to claim 1 wherein said spirals are logarithmic spirals.

3. Scanning apparatus according to claim 1 in combination with a light microscope, said sensing device lying in the path of light emerging from the microscope.

4. Scanning apparatus for controlling the passage of radiant energy to a radiant energy sensing device, said apparatus having two members coaxially mounted for independent rotation lying across a path of radiant energy to the sensing device, each of said members having opaque areas for interrupting the passage of radiant energy to the sensing device and narrow elongated transparent areas which permit the passage of radiant energy to the sensing device, the transparent area on one of the members being a radial linear slot located to move across the entire field, and the transparent area on the other said member being in the form of a logarithmic spiral, driving means for moving said members at different velocities relatively across the path of radiant energy leading to the sensing device with their transparent areas being in intersecting alignment to form a moving transparent scanning zone which moves in plural passes across different portions of a scanned field, said scanning zone being smaller in all dimensions than the field, whereby the transparent areas intersect at an angle which remains constant throughout their movement across the field and provide a moving transparent scanning zone formed by the intersection of the transparent areas which maintains a constant area throughout its movement across the scanned field.

5. A mechanical scanner according to claim 4 wherein the driving means moves the linear slot through a distance equal to its circumferential dimension as one of said logarithmic spirals is passed completely thereacross at least one whole time.

6. A mechanical scanner according to claim 4 wherein the other said member has a pair of transparent portions in the form of logarithmic spirals which are mirror images of each other.

7. A mechanical scanner according to claim 4 wherein the transparent areas have an equal width, thereby producing a transparent scanning zone in the form of an equilateral quadrilateral.

8. A mechanical scanner according to claim 4 in combination with a light microscope, said sensing device lying in the path of light emerging from the microscope.

9. A mechanical scanner according to claim 4 wherein the moving scanning zone maintains a constant quadrilateral shape throughout its movement across the scanned field.

* * * * *